United States Patent Office 3,491,107
Patented Jan. 20, 1970

3,491,107
AZIRIDINYL OXAZOLINES AND THIAZOLINES
Donald A. Tomalia, Midland, Mich., and George E. Ham, Lake Jackson, Tex., assignors to The Dow Chemical Company, Midland, Mich., a corporation of Delaware
No Drawing. Filed Jan. 6, 1967, Ser. No. 607,659
Int. Cl. C07d *91/24, 99/10;* C07c *127/16*
U.S. Cl. 260—306.7                10 Claims

ABSTRACT OF THE DISCLOSURE

New aziridinyl oxazolines or thiazolines having the formula:

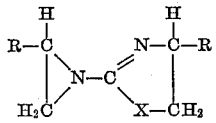

wherein R may be hydrogen, an alkyl group of from 1 to 4 carbon atoms, or a phenyl group, and X may be oxygen or sulfur, are prepared by isomerizing a carbonyl bis-aziridine or a thiocarbonyl bisaziridine with an iodide or thiocyanate ion catalyst. The aziridinyl oxazolines may also be prepared by the cyclization of a 1,3-bis(2-chloroalkyl)urea with a strong base. The new compounds have bactericidal activity.

BACKGROUND AND SUMMARY OF THE INVENTION

The present invention relates to novel compounds having both an aziridinyl group and an oxazoline or thiazoline group. More particularly, it relates to new compounds having the formula:

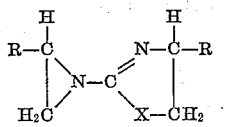

wherein R is, independently in each case, hydrogen, an alkyl group of from 1 to 4 carbon atoms (i.e., methyl, ethyl, n-propyl, iso-propyl, n-butyl, sec-butyl, or t-butyl), or a phenyl group. The compounds of this invention have a demonstrated utility as bactericides, for example, against the bacteria *E. coli*. The novel compounds of this invention are prepared by isomerizing a carbonyl bis-aziridine or a thiocarbonyl bis-aziridine with an iodide or thiocyanate ion catalyst or, in the case of the aziridinyl oxazolines, by the cyclization of a 1,3-bis(2-chloroalkyl)urea with a strong base.

DESCRIPTION OF THE PRIOR ART

It is known that carbonyl and thiocarbonyl aziridines will isomerize under certain conditions to produce an oxazoline or a thiazoline, respectively. The isomerization of aziridine derivatives is reviewed, for example, by Heine, Angew. Chem. Int. Ed. Eng. 1, 528 (1962). It is further known that oxazoline compounds may be prepared by ring closure of a haloalkyl carbamate with strong base, as disclosed by Ham, U.S. Patent 3,198,806. Neither of these two reactions has hitherto been utilized to prepare compounds having both aziridinyl and oxazoline or thiazoline functionality.

DETAILED DESCRIPTION OF THE INVENTION

The preferred method for preparing the novel compounds of this invention is by the molecular rearrangement of a bisaziridine having the formula:

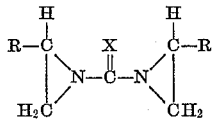

wherein R is as defined previously and X is oxygen or sulfur. In the case of unsymmetrical bisaziridines (i.e., where one of R in the above formula is hydrogen and the other R is methyl), the unsubstituted aziridine ring isomerizes preferentially. The rearrangement may be effected by contacting the bisaziridine with a catalytic amount of an iodine or thiocyanate ion catalyst for a time sufficient to allow isomerization to the aziridinyl oxazoline or thiazoline to take place. Suitable examples of such catalysts include the alkali metal iodides, such as sodium iodide, potassium iodide, and lithium iodide; the alkyl ammonium iodide complexes, such as tetrabutylammonium iodide and the like; the alkali metal thiocyanates, such as potassium thiocyanate; and the like. Only a catalytic amount of the catalyst is necessary; more increases the reaction rate. The reaction is preferably conducted in a suitable inert solvent at a temperature between about 50 and 150° C. Suitable inert solvents include acetonitrile, propionitrile, dimethyl formamide, dimethyl sulfoxide, ethylene carbonate, benzene, nitrobenzene, benzonitrile, dimethyl adipate, ethyl acetate, mixtures of the above, and the like. As used herein, the term "inert solvent" means a solvent that is non-reactive with the bisaziridines, the oxazoline or thiazoline reaction product, and the catalyst under the reaction conditions employed herein.

Suitable carbonyl bisaziridines for isomerization to produce the compounds of this invention may be prepared by the reaction of an alkylenimine with phosgene as disclosed by Bestian, Ann. Chem., 566, 210 (1950), the disclosure of which is incorporated by reference herein. Suitable thiocarbonyl bisaziridines may be prepared by a similar reaction between an alkylenimine and thiophosgene, as disclosed in Tomalia, application S.N. 573,857, filed Aug. 22, 1966, and now abandoned, the disclosure of which is incorporated by reference herein.

In practice, the new compounds of this invention are prepared by dissolving the carbonyl or thiocarbonyl bisaziridine in a suitable inert solvent, such as acetonitrile, adding from about .1 to about 20 weight percent of the catalyst, heating the resulting mixture for at least several hours at from about 60° to about 100° C., and separating the product from the reaction mixture.

An alternative method for preparing the aziridinyl oxazolines of this invention is by the cyclization of a 1,3-bis(2-chloroalkyl)urea having the formula:

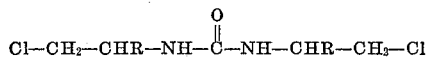

wherein R is as defined previously, with a strong base, such as an alkali metal hydroxide or a strongly basic ion-exchange resin in the free base form. The 1,3-bis(2-chloroalkyl)urea is contacted with the strong base for a time sufficient to allow the cyclization to aziridinyl oxazoline to take place. Methods for preparing the 1,3-bis(2-chloroalkyl)ureas are known in the art.

In practice, this alternative method for preparing the compounds of this invention is carried out by adding the 1,3-bis(2-chloroalkyl)urea to a molar excess of the strong base, such as potassiumhydroxide, in a suitable inert solvent, such as methyl alcohol or any of the solvents listed previously. The resulting mixture is desirably heated for a time of from about 2 to about 10 hours at a temperature between about 50 and 150° C., desirably reflux temperature of the reaction mixture, and the product is separated from the reaction mixture.

The new compounds of this invention are white, crystalline solids, with discernible melting points or oily liquids with well-defined boiling points. They show bactericidal activity against the bacteria *E. coli*.

DESCRIPTION OF THE PREFERRED EMBODIMENTS

The following non-limiting examples describe representative specific embodiments and the best modes contemplated by the inventors for practicing the invention claimed.

Example 1.—Isomerization of 1,1'-(carbonyl) bisaziridine

A quantity of 2.0 g. of tetrabutylammonium iodide, 100 ml. of acetonitrile, and 7.9 g. of 1,1'-(carbonyl)-bisaziridine were added to a reaction vessel equipped with means for stirring, refluxing, and temperature control. The reaction vessel was heated to the reflux temperature of the reactants (82° C.) and maintained there for 19 hours. At the end of this time period, the reaction mixture was allowed to cool to room temperature, and the acetonitrile was removed at a reduced pressure of 70 mm. Hg. After removal of the acetonitrile, the pressure was lowered to below 1 mm. of Hg. The product sublimed, yielding a white, crystalline solid. A quantity of 3.3 g. of product, M.P. 27–29° C., was obtained. The infrared and NMR spectra of the product were consistent for those expected for 2-(1-aziridinyl)-2-oxazoline, and the product was found to contain 96.8 percent of the theoretical aziridine group content. Similar runs were carried out in benzene, giving between 70 and 80 percent yield of 2-(1-aziridinyl)-2-oxazoline. Shorter reflux times, e.g. 3–4 hours, were found sufficient to give yields between 70–80 percent of 2-(1-aziridinyl)-2-oxazoline.

Substitution of other 1,1'-(carbonyl)-bis-aziridines in equivalent amounts gives a similar product when isomerized with a sodium iodide catalyst. Thus, for example, 2-(2-phenyl-1-aziridinyl)-4-phenyl-2-oxazoline is made from 1,1'-(carbonyl)-bis(2-phenylaziridine).

Example 2.—Isomerization of 1,1'-(thiocarbonyl)-bis-aziridine

To 10 g. of 1,1'-(thiocarbonyl)-bis-aziridine in 75 ml. of dry acetonitrile was added 0.10 g. of sodium iodide. The resulting mixture was allowed to stand over night at 23–25° C. The benzene was removed under vacuum, and the remaining light amber residue was distilled to give a light amber fluid having a boiling point of 37.5–48° C. at 1 mm. Hg. The fluid had an NMR spectrum consistent with the structure of 2-(1-aziridinyl)-2-thiazoline.

Example 3.—Isomerization of methyl-substituted 1,1'-thiocarbonyl-bis-aziridine

To 18 g. of 1,1'-(thiocarbonyl)-bis-(2-methyl-aziridine) in 75 ml. of dry benzene was added 0.20 g. of tetrabutylammonium iodide. The resulting mixture was allowed to stand for three days at 23–25° C., and the benzene was removed under vacuum. The resulting orange-yellow, oily residue was distilled to give 6.8 g. (38% yield) of a light yellow distillate having a boiling point of 102–105° C.

at 1.05 mm. Hg. The distillate had an NMR spectrum consistent with the structure:

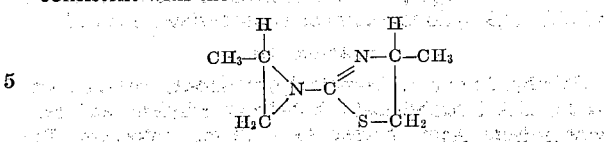

Example 4.—Cyclization of 1,3-bis(2-chloroalkyl)urea

A quantity of 10.55 g. (0.057 mole) of 1,3-bis-(2-chloroethyl)urea was added to 6.38 g. (0.114 mole) of potassium hydroxide dissolved in 100 ml. of methyl alcohol. A mild exotherm was noted during this addition. The reaction mixture was refluxed for three hours, then cooled to room temperature. A quantity of 6.89 g. (81 percent of theory) of potassium chloride was filtered off, and the methanol was removed from the filtrate by vacuum at room temperature. A quantity of 4.90 g. of light yellow, low melting residue was obtained, which represents a crude yield of 77 percent. The product thus obtained had an infrared and an NMR spectrum consistent with the structure of 2-(1-aziridinyl)-2-oxazoline.

Substitution of other 1,3-bis-(2-chloroalkyl)ureas, as disclosed previously, in the above procedure gives similar products.

The compound 2-(1-aziridinyl)-2-oxazoline was evaluated for bactericidal activity against the bacteria *E. coli*. A 50 percent by weight aqueous solution of 2-(1-aziridinyl)-2-oxazoline was streaked onto a petri dish containing nutrient agar which had previously been streaked with the bacteria *E. coli*. After 72 hours at room temperature, it was noted that bacteria readily grew over the surface of the plate except where the test compound was streaked. A similar result is obtained with 2-(1-aziridinyl)-2-thiazoline.

What is claimed is:
1. A compound of the formula:

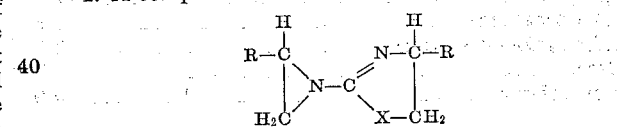

wherein R is, independently in each case, hydrogen, an alkyl group of from 1 to 4 carbon carbon atoms, or a phenyl group, and X is oxygen or sulfur.

2. The compound of claim 1 wherein R is hydrogen or methyl.
3. The compound of claim 1 wherein X is oxygen.
4. The compound of claim 3 wherein R is hydrogen or methyl.
5. The compound of claim 1 wherein X is sulfur.
6. The compound of claim 5 wherein R is hydrogen or methyl.
7. A process for preparing a compound as in claim 1 which comprises contacting a bisaziridine having the formula

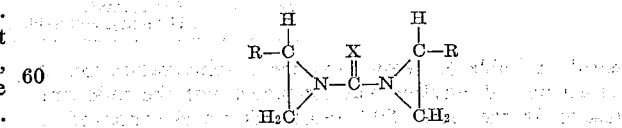

wherein R and X are as defined in claim 1, with a catalytic amount of an iodide or thiocyanate ion catalyst for a time sufficient to allow isomerization to the aziridinyl oxazoline or thiazoline to take place.

8. A process as in claim 1 wherein R is hydrogen or methyl and the catalyst is tetrabutylammonium iodide or sodium iodide.

9. A process for preparing a compound as in claim 1 wherein X is oxygen which comprises contacting a 1,3-bis(2-chloroalkyl)urea having the formula

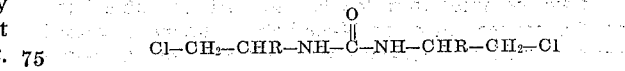

wherein R is as defined in claim 1, with a strong base for a time sufficient to allow cyclization to an aziridinyl oxazoline to take place.

10. A process as in claim 9 wherein R is hydrogen or methyl and the strong base is potassium hydroxide.

References Cited

UNITED STATES PATENTS 3,198,806  8/1965  Ham _____ 260—307

OTHER REFERENCES

Heine: Agnew, Chem. Int. Ed. Eng., vol. 1, pp. 528–532 (1962).

ALTON D. ROLLINS, Primary Examiner

U.S. Cl. X.R.

260—553; 424—270, 272